US012657920B2

(12) United States Patent
Harbin et al.

(10) Patent No.: US 12,657,920 B2
(45) Date of Patent: Jun. 16, 2026

(54) STANDALONE VISION SYSTEM

(71) Applicant: LightGuide, Inc., Wixom, MI (US)

(72) Inventors: Neil B. Harbin, Royal Oak, MI (US);
Miranda R. Perry, Fenton, MI (US);
William T. Sommerville, Wixom, MI
(US); Mikayla M. Ray, Farmington
Hills, MI (US)

(73) Assignee: LightGuide, Inc., Wixom, MI (US)

( * ) Notice: Subject to any disclaimer, the term of this
patent is extended or adjusted under 35
U.S.C. 154(b) by 0 days.

(21) Appl. No.: 18/451,463

(22) Filed: Aug. 17, 2023

(65) Prior Publication Data

US 2024/0062549 A1 Feb. 22, 2024

Related U.S. Application Data

(60) Provisional application No. 63/398,677, filed on Aug.
17, 2022.

(51) Int. Cl.
| | |
|---|---|
| *G06V 20/52* | (2022.01) |
| *G06V 10/94* | (2022.01) |
| *G06V 20/40* | (2022.01) |
| *H04N 7/18* | (2006.01) |
| *H04N 23/90* | (2023.01) |

(52) U.S. Cl.
CPC ............ *G06V 20/52* (2022.01); *G06V 10/945*
(2022.01); *G06V 20/41* (2022.01); *H04N*
*7/181* (2013.01); *H04N 23/90* (2023.01)

(58) Field of Classification Search
CPC ...... G06V 20/52; G06V 20/41; G06V 10/945;
H04N 23/90; H04N 7/181
See application file for complete search history.

(56) References Cited

U.S. PATENT DOCUMENTS

| | | | |
|---|---|---|---|
| 7,515,981 B2 | 4/2009 | Ryznar et al. | |
| 9,658,614 B2 | 5/2017 | Ryznar et al. | |
| 9,965,897 B2 | 5/2018 | Ryznar et al. | |
| 10,983,500 B2 | 4/2021 | Ryznar et al. | |
| 12,108,222 B2 | 10/2024 | Ryznar et al. | |
| 12,510,998 B2 | 12/2025 | Sommerville et al. | |
| 2009/0077504 A1* | 3/2009 | Bell ........................ | G06F 3/017 |
| | | | 715/863 |

* cited by examiner

*Primary Examiner* — Girumsew Wendmagegn
(74) *Attorney, Agent, or Firm* — Gardner, Linn, Burkhart
& Ondersma LLP

(57) ABSTRACT

A vision system for a work area includes a camera posi-
tioned to have a field of view of a portion of the work area.
The camera captures video of the actions of a worker
performing a task at the work area. A controller monitors the
captured video. The controller includes a vision program
with vision tools, each defining bounded regions within the
work area from the perspective of the camera. The vision
program monitors the captured video for the worker to
interact with the vision tool. The vision program determines
that the worker's interaction with the vision tool is a user
selection. The interaction with the vision tool includes the
worker placing a hand or finger over and/or on the vision
tool. The interaction with the vision tool includes the worker
touching or moving a component or portion of the work-
piece.

20 Claims, 6 Drawing Sheets

| 216a | 216b | 216c | 216d |

| 216e | 216f | 216g | ... | 216n |

STANDALONE VISION SYSTEM

CROSS REFERENCE TO RELATED APPLICATION

The present application claims priority of U.S. provisional application Ser. No. 63/398,677, filed Aug. 17, 2022, which is hereby incorporated herein by reference in its entirety.

FIELD OF THE INVENTION

The present invention is directed to improvements in a system for observing an individual in the performance of operational steps, and in particular a system that provides observational feedback to a manufacturing execution system.

BACKGROUND OF THE INVENTION

Conventional manufacturing facilities include workers performing operational steps such as in the assembly, inspection, kitting, and/or training involved in manual processes. Numerous activities involve the performance of pre-designated operational steps to properly complete a particular task, with some such activities needing to be completed within a specified time or standard time allowance. The performance of such activities can be guided through the use of light guided systems that provide visual prompts and indicators to guide a worker in the performance of their work. Such visual prompts and indicators may provide instructions to the worker as well as augmented reality "soft buttons" by which workers may input responses (such as, indicating a task is complete or that they are ready to start a new task). The soft button may be an image projected onto a surface that is visualized with a camera that detects when the worker places, for example, their hand or finger over the projected image.

SUMMARY OF THE INVENTION

Embodiments of the present invention provide methods and an apparatus to improve the performance of operational steps by monitoring and evaluating those operational steps. In one embodiment, a vision system includes one or more cameras that are positioned with respect to a work area to monitor the work area. The video outputs of the cameras are processed by one or more vision tools of the vision system. The vision tools are operable to detect one or more defined actions of the worker. Outputs of the vision tools are evaluated by the vision system and used to produce evaluation outputs which are provided to a separate manufacturing execution system that is coordinating the activities at the work area.

A vision system for a work area includes a camera positioned to have a field of view of at least a portion of the work area. The camera captures video of the actions of a worker performing a task at the work area and operates in connection with a vision program having one or more vision tools each defining bounded regions within the work area from the perspective of the camera. A controller monitors the captured video. The vision program monitors the captured video regarding the workers interaction with the vision tool. The vision program evaluates and/or determines the worker's interaction with the vision tool, such as whether a preselected criteria is satisfied. The interaction with the vision tool includes the worker placing a hand or finger within and/or over and/or on the bounded region of the vision tool. The interaction with the vision tool includes the worker touching or moving a component or portion of a workpiece. The worker may be provided an indication that the vision tool's bounded region includes a component or portion of a workpiece placed within the work area.

According to an aspect of the present invention, a vision system for a work area in an assembly line comprises a first camera and a controller. The first camera is positioned with respect to a work area. The first camera is positioned to have a field of view that includes a selected portion of the work area. The first camera is configured to capture video of the actions of a first worker performing a task at the work area. The controller includes a memory and is configured to control the first camera and to monitor the captured video of the first camera. The controller comprises a vision program comprising one or more vision tools. A first vision tool of the one or more vision tools defines a first bounded region within the work area from the perspective of the first camera. The vision program is operable to monitor the captured video from the first camera for the first worker to interact with the first vision tool. The vision program is operable to determine that the first worker's interaction with the first vision tool is a user selection. The interaction with the first vision tool includes the first worker placing a hand or finger over and/or on the first vision tool. The first worker is provided an indication that the first vision tool's bounded region includes a first component or portion of a workpiece placed within the work area. The interaction with the first vision tool comprises the first worker touching or moving the first component or portion of the workpiece.

In another aspect of the present invention, a vision system for a work area in an assembly line includes a first camera and a controller. The first camera is positioned with respect to a work area and is positioned to have a field of view that includes a selected portion of the work area. The first camera is also configured to capture video of the actions of a first worker performing a task at the work area. The controller includes a memory and is configured to control the first camera and to monitor the captured video of the first camera. The controller includes a vision program including one or more vision tools. A first vision tool of the one or more vision tools defines a first bounded region within the work area from the perspective of the first camera. The first bounded region includes a first component or portion of a workpiece placed within the work area. The vision program is operable to monitor the captured video from the first camera. The vision program is configured to perform machine vision processing of the first bounded region visible in the captured video to detect any change in the first bounded region.

In another aspect of the present invention, the vision system includes a plurality of cameras arranged around the work area.

In a further aspect of the present invention, the controller includes a programmable logic controller.

In another aspect of the present invention, the vision system includes one or more computer systems, each executing one or more vision programs, with each vision program receiving and processing video data and one or more vision tools. The one or more computer systems can be physically local, networked, or implemented as virtual modules on a single computer, or as virtual modules on the cloud. Each of the computer systems may be communicatively coupled to one or more cameras of the vision system.

These and other objects, advantages, purposes and features of the present invention will become apparent upon review of the following specification in conjunction with the drawings.

BRIEF DESCRIPTION OF THE DRAWINGS

FIG. 1 is a block diagram of a vision system that includes an arrangement of cameras for monitoring and evaluating operational activities at a workstation in accordance with the present invention;

FIG. 2B is a top-down diagram illustrating an arrangement of vision tools upon a workpiece arranged within the workstation in accordance with the present invention;

DESCRIPTION OF THE PREFERRED EMBODIMENTS

The present invention will now be described with reference to the accompanying figures, wherein numbered elements in the following written description correspond to like-numbered elements in the figures. Methods and systems of the exemplary embodiments provide for an arrangement of cameras about a workstation for the monitoring of workers performing operational steps carried out upon a workpiece arranged within the workstation. Through the use of two-dimensional (2D) and three-dimensional (3D) machine vision technology, an exemplary vision system interacts with a third-party manufacturing execution system (MES) that coordinates the performance of the operational steps carried out upon the workpiece. As described herein, the vision system's machine vision functionality provides for the observation, detection and/or evaluation of worker activities within the fields of view of the cameras such that the vision system detects worker activities upon the workpiece, evaluates the detected activities, and based upon the evaluation of the worker's activities is operable to provide the MES with signals regarding the operational activities. Such signals may include, for example, indications that a step has been completed, to report a defect, request assistance, and inputting production data. Note that while the MES 150 receives messages from the vision system, the exemplary vision system does not receive outputs from the MES 150.

Figure 1:
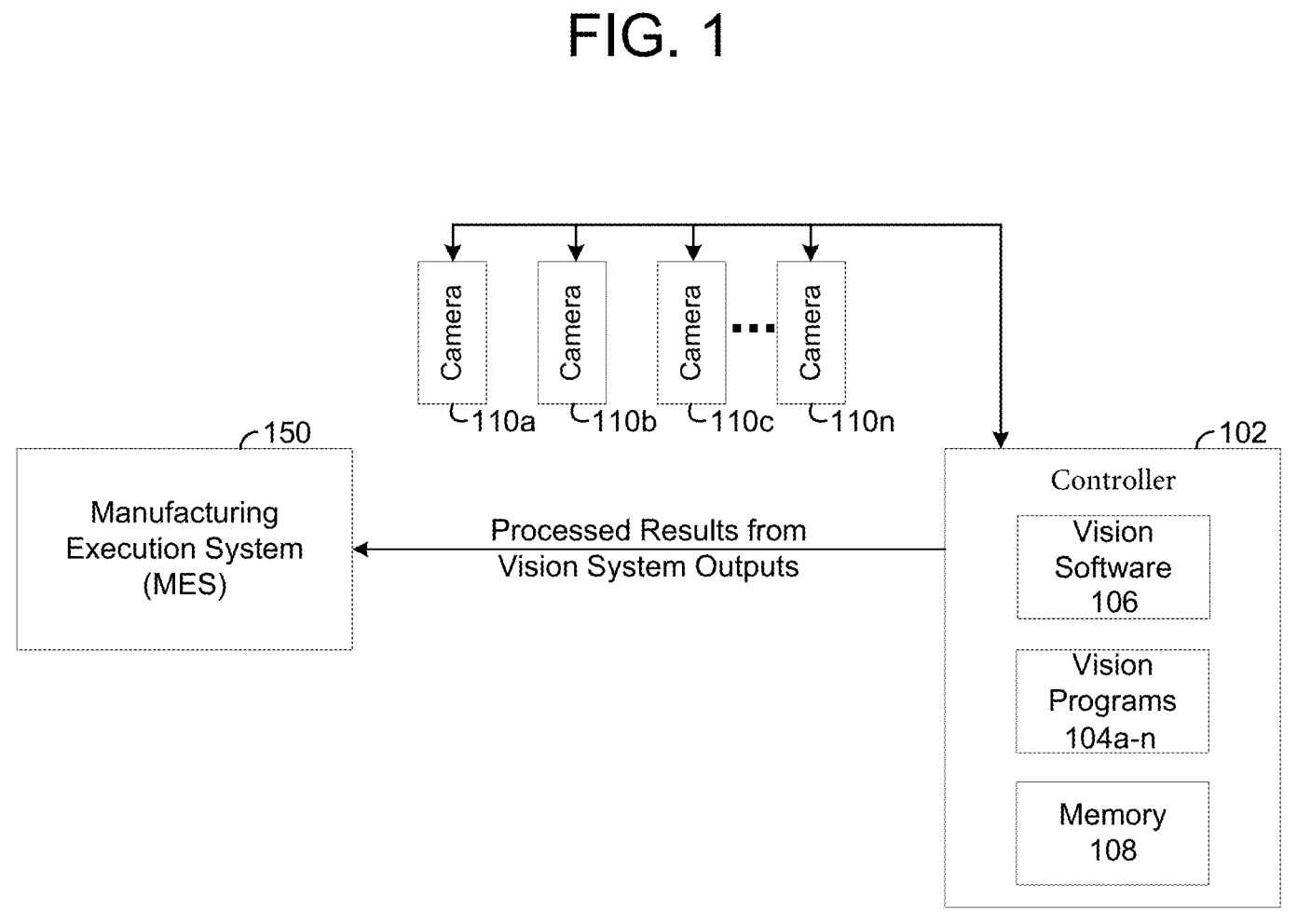
Figure 2A:
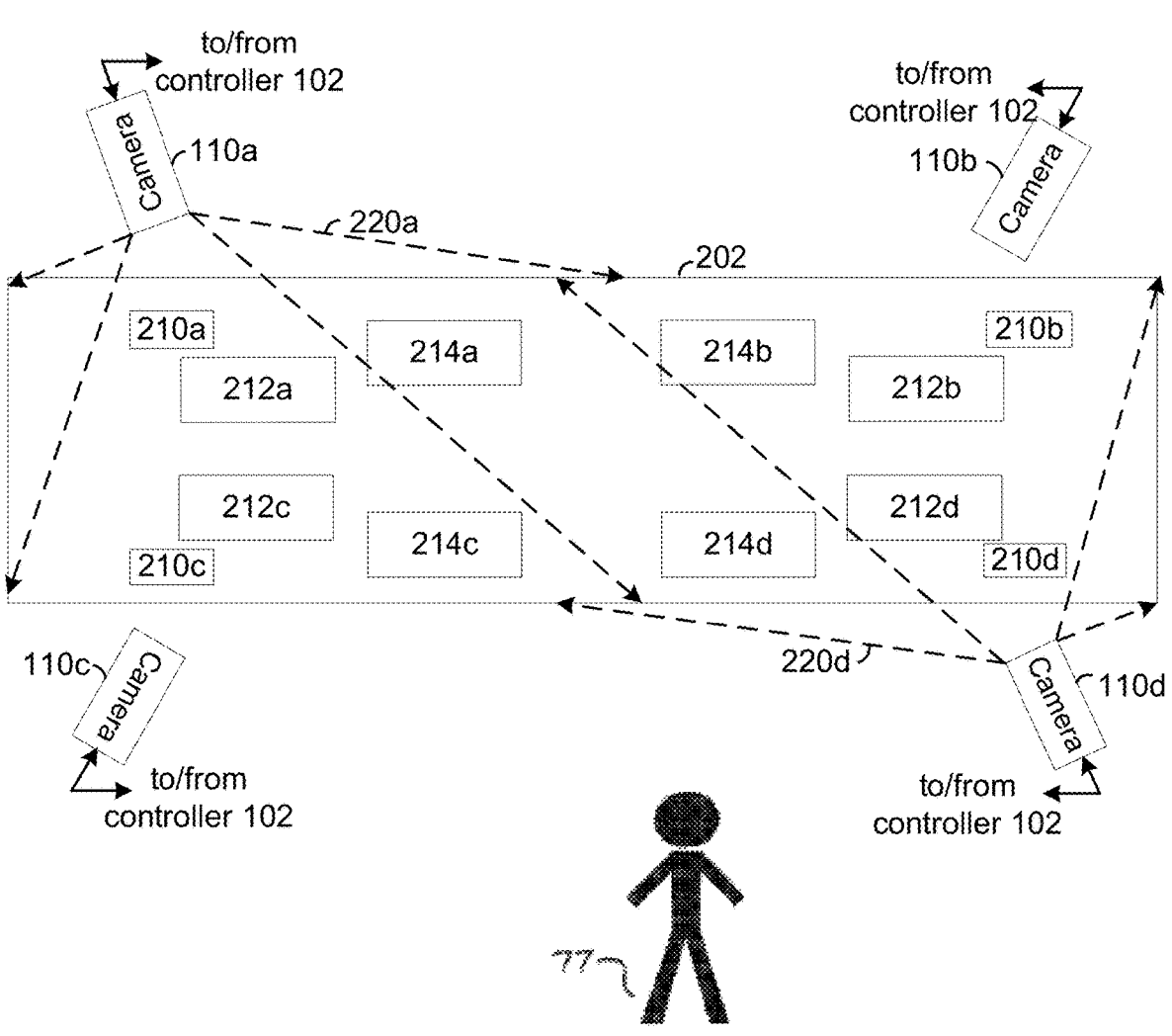
FIG. 2A is a top-down diagram illustrating the placement of cameras of FIG. 1 around a workstation, and with defined vision tools arranged within the fields of view of the cameras in accordance with the present invention.
Figure 2B:
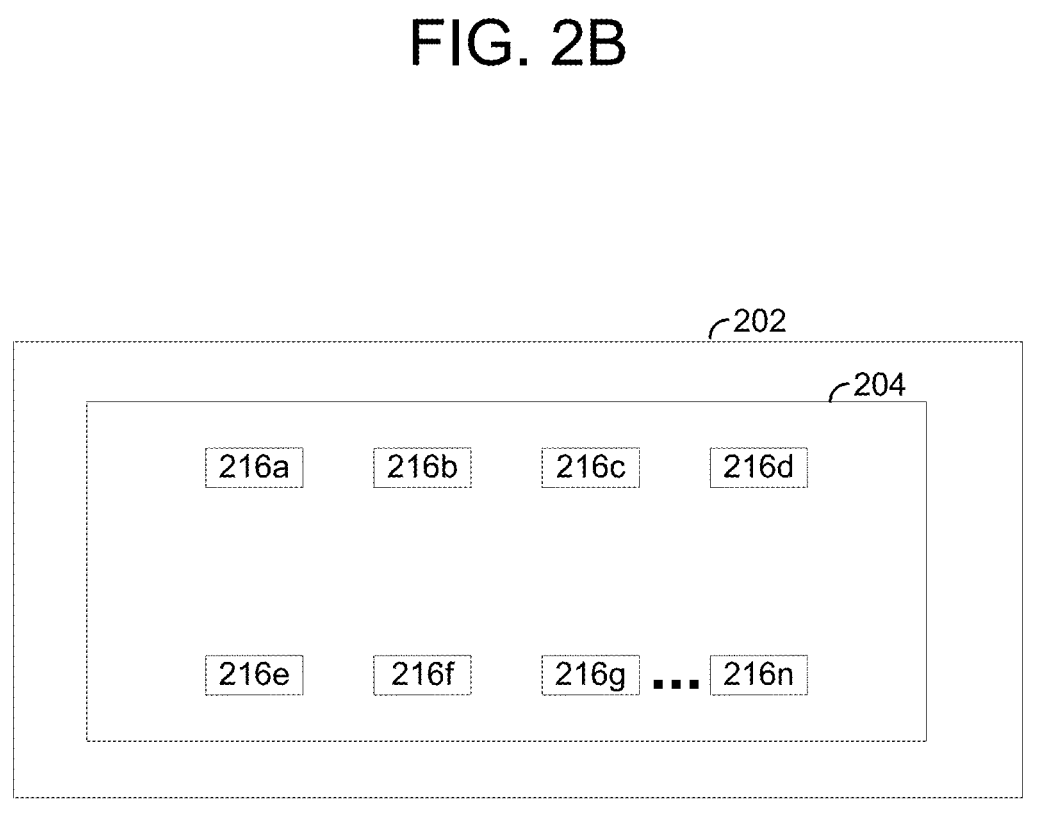
Figure 2C:
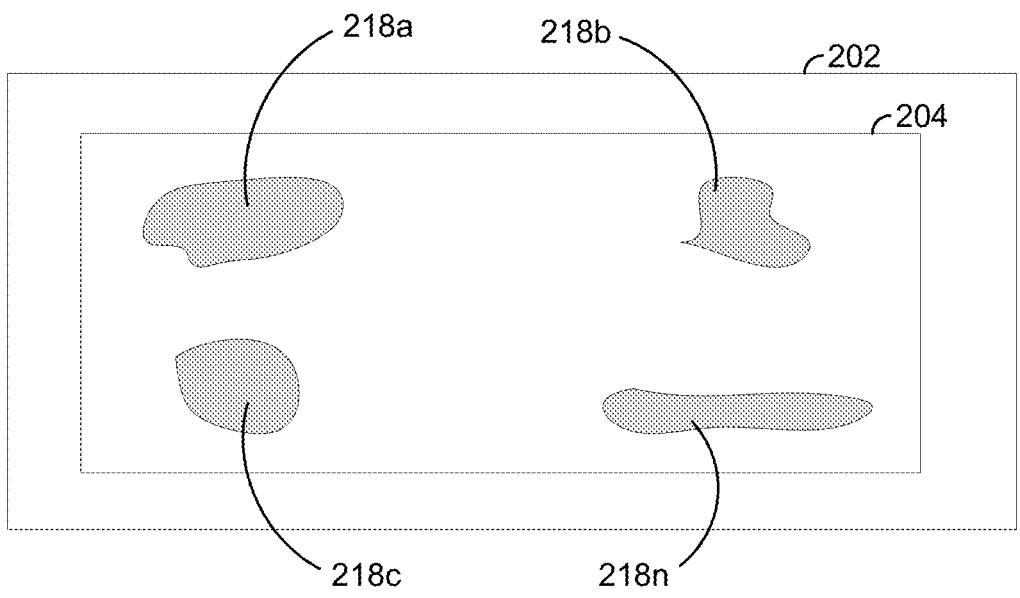
FIG. 2C is a top-down diagram illustrating an arrangement of vision tools defined for particular locations upon a workpiece arranged within the workstation in accordance with the present invention.

Referring to FIG. 1, a vision system 100 includes an arrangement of cameras 110a-n whose video outputs are received and evaluated by a controller 102 that includes one or more vision programs 104a-n and vision software 106. The vision system 100 can be implemented with one or more computer systems, each executing one or more vision programs 104a-n and/or vision software 106 (by accessing respective memories and executing programs in their respective processors), with each vision program 104a-n receiving and processing video data with respect to relevant vision tools. The one or more computer systems can be physically local, networked, or implemented as virtual modules on a single computer, or as virtual modules on the cloud. Each computer system can be communicatively coupled to one or more cameras of the arrangement of cameras 110a-n. The vision programs 104a-n and the vision software 106 may be configured and operable to store their data in a memory 108. As described herein, each vision program 104a-n is associated with at least one of the cameras 110a-n, with each vision program 104a-n having one or more configurable vision tools 210-218 (see FIGS. 2A-2C), where the vision tools each comprise bounded regions in 3D space within the field of view of a respective camera 110. The vision software 106 receives and evaluates indications from the vision programs 104a-n and their respective vision tools, and outputs processed results that are received by an exemplary manufacturing execution system (MES) 150. As illustrated in FIGS. 2A-2C, a vision tool 210-218 may be implemented as a defined portion of a camera's field of view. The defined portion of the field of view, as described herein, can be defined as a place where a worker or operator 77 can place their hand that is detected by the vision program 104 to signal the vision software 106. The vision programs 104a-n are thus configured to monitor and detect a worker's interaction with the vision tools 210-218, and based upon these detected interactions, the vision software 106 is configured to evaluate those detected interactions and signal the MES 150 accordingly.

In an aspect of the present invention, certain machine vision aspects of the video output of a camera 110 may be used to monitor the operational activities of a worker/operator 77 in a workstation or work area 202 (see FIG. 2A). The camera 110 is positioned such that a field-of-view 220 of the camera 110 is sufficient to capture any motion or activity of the worker/operator 77 working within the workstation 202. When the worker/operator 77 engages in activities within the workstation 202, the camera 110 is monitoring the workstation 202. The machine vision aspects of the video output of the camera 110 and the controller 102 (and the vision programs 104 and vision software 106) detect the worker/operator 77 interacting within/upon a particular bounded region in 3D space (from the perspective of the camera 110), such as by detecting the worker/operator 77 placing a finger within/upon the bounded region of vision tool 216, 218 or interacting with a portion of the workpiece 204 corresponding with the vision tool 216, 218. Such detected/determined worker interaction (with the vision tool 216, 218) is then used by the vision software 106 as an input that the particular vision tool 216, 218 was "selected" by the worker/operator 77. For example, an exemplary vision tool 216, 218, configured to function as a soft button, may be configured to indicate to the vision software 106 that the worker/operator 77 is ready to start a task, that a task step has been completed, or that a current task is being paused.

As illustrated in FIGS. 2A-2C, an exemplary quartet of cameras 110a-d are arranged around a workspace or work area 202. Exemplary fields of view 220a, 220d are illustrated for corresponding cameras 110a, 110d. Each camera 110a-d is positioned and arranged such that its corresponding field of view includes at least a portion of the work area 202. As illustrated in FIG. 2A, the vision programs 104a-n include a plurality of vision tools (e.g., bounded regions of 3D space) 210, 212, 214 arranged within each camera's field of view 220. Each vision program 104a-n can include one or more vision tools. Soft buttons (or more generally bounded regions) may be represented by graphical visual indicators projected by an operational guide system, such as disclosed in U.S. Pat. No. 7,515,981 (hereinafter the '981 patent), which is hereby incorporated by reference in its entirety. In the absence of a projected graphical soft button, there may be a physical sticker on an exemplary workpiece, part, tooling, or fixture. Alternatively, the location of the soft button can be indicated to the worker/operator 77 through the use of a monitor or 2D/3D wearable headset showing where the soft button should be on the part. In a further alternative, the bounded region can be understood as the entire workpiece, or a portion or component of the workpiece. Still further, the worker/operator 77 need not be provided with a specific indication of the region bounded by a vision tool. For example, the worker/operator 77 could be instructed to touch or remove a series of components (e.g., a fender), with a soft button over each of the series of components. FIG. 2B illustrates a set of exemplary vision tools 216a-h arranged on a workpiece 204, while FIG. 2C illustrates an arrangement of exemplary definable vision tools 218a-n (each of the vision tools 216, 218 defined by the vision programs 104). Each of the definable vision tools 218 is used to indicate a particular component of the workpiece 204 (from the perspective of a particular camera 110). The particular shapes, orientations, and sizes of the bounded regions with respect to each other and with the workpiece 204, are exemplary in nature. Other shapes, orientations and sizes can be used.

As noted, in the illustrated embodiment the vision system 100 is integrated or interfaced with a manufacturing execution system (MES) 150, which may comprise an operational program system or operational software system. Manufacturing, production, and/or assembly environments frequently employ operational software systems 150, which are sometimes referred to as enterprise resource planning (ERP) systems, used in association with product planning, production scheduling, inventory control, and the like. These systems are generally defined as control systems for managing and monitoring work-in-process in a factory environment, such as on a factory floor. Examples of such operational software systems include, but are not limited to, SAP® business software provided by SAP AG of Germany, PROPLANNER® business software provided by Proplanner Corp. of Iowa, USA, as well as systems such as General Motor Corporation's Global Enterprise Production Information and Control System (GEPICS).

The output from the vision software 106 is received by the MES via a communications protocol. For example, vision system 100, such as via controller 102, may translate or convert data signals that are to be sent from vision system 100 via controller 102 to MES 150 from one protocol to a different protocol that is useable by the MES 150. In one exemplary embodiment, the communications protocol between the MES and the vision software 106 of the controller 102 is MQTT, a network protocol for transporting messages between devices. Other communications protocols could be used. Furthermore, other communications interfaces could be used, such as, Modbus TCP, RESTful Web API, Ethernet/IP, DeviceNET, PRFIBUS, PROFINET, TCP Socket, UDP, RS-232, RS-485, EtherCAT, ActiveMQ, MSMQ, OPC DA, OPC UA, FTP, SFTP, and WCF. Other uses of the output from the vision software 106 include, for example, a POS barcode scanner, inserting a record into an SQL server or another database, writing to a file, sending an email using SMTP, 24-volt discrete I/O, 4-20 mA analog signal, dry contact relays, vibration transducers, indicator lights on a panel, audio signals from a speaker, and printing a paper or label.

In an exemplary embodiment, the controller 102 includes or is configured to operate as a virtual barcode scanner configured to provide a conventional binary barcode output of signals to the MES 150, such as for the MQTT protocol. Depending on the evaluation of the detected vision tools responding to worker interactions upon the workpiece, a variety of defined messages could be output to the MES 150. In accordance with a conventional barcode scanner output, an exemplary output message to the MES 150 could include any length of message within the character length limitations of the virtual barcode scanner and/or the MQTT protocol. For example, controller 102 may be configured to output a signal in such a barcode scanner output format to thereby operate or function as a virtual barcode scanner.

As illustrated in FIG. 2A, one or more cameras may be arranged to have a field of view 220 of the work area 202 and the workpiece arranged 204 upon or within the work area 202. While FIG. 2A illustrates an exemplary four cameras 110a-d, any quantity of cameras 110a-n could be used. As illustrated in FIG. 2A, each camera 110 includes a respective field of view 220 that covers at least a portion of the work area 202. The size and shape of the fields of view 220a-n (of the cameras 110a-n) may be dependent upon the arrangement of their respective cameras 110a-n, the size and shape of the work area 202, and the size and shape of the workpiece 204 itself.

Each of the vision programs 104a-n includes one or more configurable vision tools, each operable to indicate that something is in a particular bounded region in 3D space (e.g., the vision tools 210, 212, 214, 216, and 218 defined within particular fields of view of the cameras 110a-n). That is, a vision tool is configured to be a particular desired bounded region such as by use of the vision program. Each of the vision programs 104a-n may be named, e.g., "cam1," "cam2,", etc., and the individual vision tools named "cam1: tool1," "cam1:tool2," "cam2:tool1," etc. Such names could also be user-defined, such as, leftside:front, rightside:rear, etc. Exemplary embodiments of the vision software 106 and vision programs 104a-n can be arranged such that different vision programs may be run. For example, a plurality of vision programs 104a-n can run simultaneously (e.g., four (4) programs running at the same time), with each of the vision programs 104a-n using the video feed from any of the cameras 110a-n. Note that two different vision programs 104a, b can simultaneously access the same camera 110 (i.e., receive the video output of the same camera 110) to analyze the captured video with respect to their respective vision tools.

Figure 4:
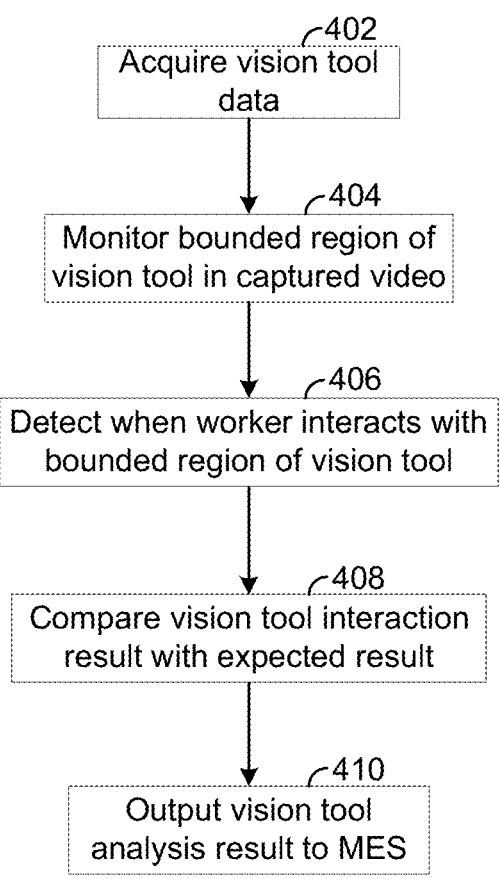
FIG. 4 is flow diagram illustrating the steps to a method for observing the operational steps carried out upon a workpiece arranged within a workstation in accordance with the present invention.

Referring to FIG. 4, an exemplary method for performing the machine vision processing of captured video from cameras positioned to monitor a work area for worker activities related to operational steps performed on a workpiece in the work area, includes the following steps. In step 402, vision tool data is acquired. Such vision tool data includes the 3D dimensional information for a bounded region within the work area from the perspective of a camera. In step 404, the bounded region of the vision tool is monitored in the captured video. In step 406, a worker is detected interacting with the bound region of the vision tool. The machine vision functionality of a vision program is operable to detect when a worker's hand or finger is placed onto or over the bounded region of the vision tool. In step 408, the vision tool interaction result is compared with an expected result. That is, is the detected result the expected result? In step 410 a result of the analysis of the vision tool interaction is output to a manufacturing execution system using a selected communications protocol.

While as discussed herein, the vision tool is described as a soft button, other functionality could also be performed. The exemplary camera 110 may be a 3D camera, a 2D color camera, a 2D monochrome camera, and/or a thermal camera. Such exemplary cameras may be used by the vision programs 104a-n and the vision software 106 to perform any one or more of the following evaluative functions:

Recognizing a part based on a match correlation function.

Looking for particular color hues.

Looking for human skin tones (i.e., yellows, browns, pinks, and reds, as opposed to blues, greens, and purples).

Filtering out moving parts.

Measuring where the first point exists within a linear region.

Creating statistics on contiguous blobs of pixels.

Reading text or barcodes.

Looking for high-contrast areas.

Creating depth information statistics, such as min/max/deviation of depth in an area.

Looking for the presence and locations of retroreflective tape.

Verifying that a location sufficiently hot or cold.

Based on the outputs of the vision programs 104a-n and the evaluation(s) performed by the vision software 106, any of the following higher-level tasks could be carried out:

Signaling that a workpiece 204 has arrived or left the workstation 202.

Signaling that a tool or clamp was placed or removed.

Reading information off stickers/labels/paperwork about a workpiece 204.

Discriminate on type of workpiece 204 from another.

Verifying that a human is in the workstation 202 and in the proper place (but not as a safety interlock to energize hazardous equipment).

Ensuring a torque tool is over the proper bolt.

Ensuring parts are placed or removed as necessary from the workpiece 204.

Measuring and verifying the location or length of components.

Ensuring a soldering, brazing, or welding operation has occurred.

Ensuring food is adequately cooked.

Confirming that the proper parts bin was accessed for the purposes of error proofing a pick-to-life system or paper- or monitor-based picking operations.

While an exemplary vision tool size, shape, and position in the field of view 220 of a camera 110 may be defined via a computer/monitor displaying the particular field of view 220 in question, other methods for defining the vision tool 218 are also possible. For example, a 3D object could be placed on the surface of the workstation 202 and the vision software 106 and vision programs 104a-n trained to recognize that object and create a vision tool 218 wherever the object is (with the size, shape, and outline of the new vision tool 218 defined by the object). As discussed herein, each particular vision tool is defined with respect to a particular camera's field of view 220 (a particular camera field of view (or perspective) for each vision tool). Alternatively, retroreflective material could be used to show up under a depth camera as a "void" (because it would overload the sensor in the camera) and this void could be used to determine where the vision tool 218 should go (with respect to the field of view of the camera 110). An exemplary wireless barcode scanner could be used with an array of command barcodes that tell the vision software 106 and the vision programs 104a-n to create a vision tool where they see a particular 3D object or retroreflective material at that instant in the camera's captured video output. Alternatively, a conventional game controller could be configured to perform this function and to enable fine adjustments to the size and shape, and location of the new vision tool 218.

In an aspect of the present embodiment, the vision software 106 can also be configured to store 2D, 3D, or thermal images in the memory 108 based on operator input. If these images are displayed on a monitor, then they could also annotate those images in real-time using a retroreflective want, blue gloves, or other signals to point out defects, or else to prove that they inspected something important. This could allow the worker/operator 77 to point to more than 2 things within a single image (pointing at one or two things would also be possible, but more trivial). The worker/operator 77 (or an engineer working in a remote location) might also simply wish to accept or reject pictures that the cameras 110 take in case they are blurry otherwise not ideal. The worker/operator interaction may also be used to turn on a bright flash to get more clear pictures (as necessary). Such image capture and review functionality provides for the worker/operator 77 or another remote individual (after the fact) to review the executed operational steps and to document particular moments of the operational steps.

In another aspect of the present embodiment, a 3D camera might be used to cause a collaborative robot to reposition a high resolution 2D camera to take a picture, or else cause the robot to do value-added work at the worker/operator's command (e.g., dispensing glue or polish a surface). The vision software 106 could also be used to trigger an automatic guided vehicle to enter or leave a station, signal that materials need to be replenished, turn on a (safe) hand tool, activate a conveyor, or cause a clamping mechanism or magnetic lock to engage.

Figure 3:
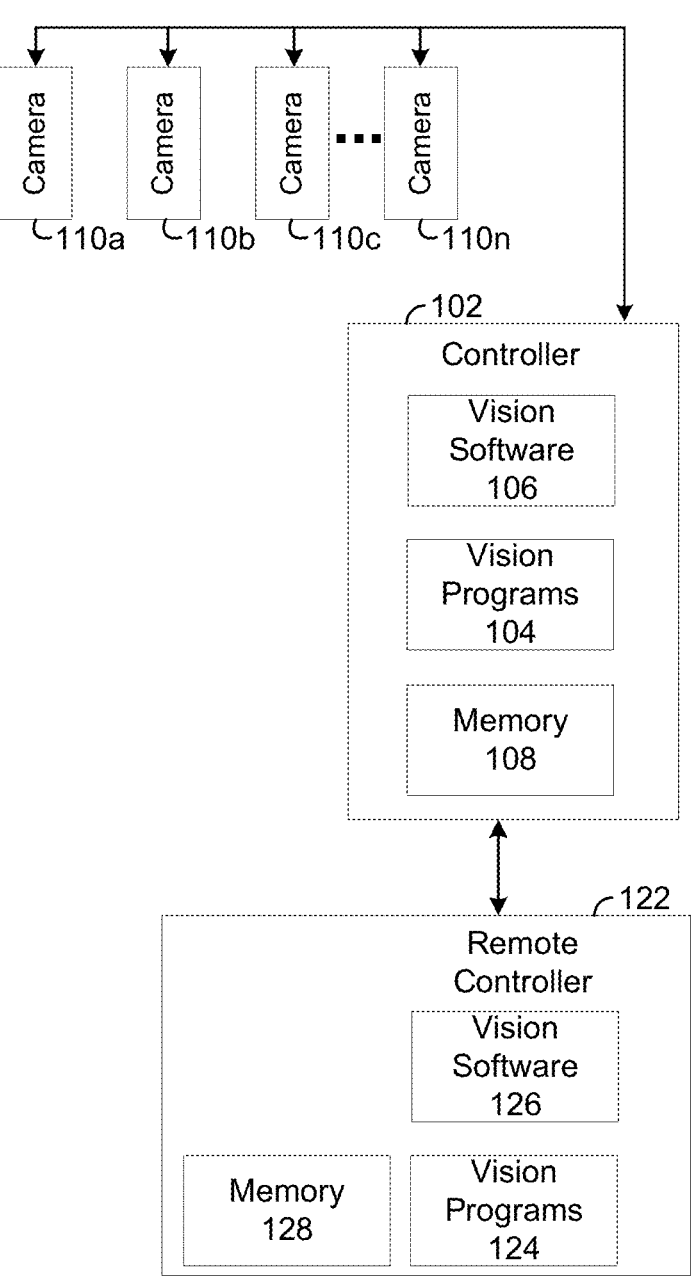
FIG. 3 is a block diagram of the vision system of FIG. 1 with a remote controller in accordance with the present invention.

In an aspect of the present embodiment, a live vision view (i.e., video output from one or more cameras 110) is made available to a remote engineer who could create and edit the vision tools 218a-n from a remote desk or home office with a remote controller 122 that includes a remote vision software 126 and one or more vision programs 124, and a memory 128 (see FIG. 3). This would allow for the refinement and definition of needed vision tools 218 when extensive changes are required. With the advent of 5G, Wi-Fi 6, and gigabit Ethernet technologies, the cameras 110 may stream their video data to a central server (running a version of the remote controller 122) that runs the vision software 126 and vision programs 124a-n as well (see FIG. 3).

Thus, detecting a worker/operator performing operational steps in a workstation by detecting the triggering of vision tools monitored by vision programs, and the evaluating of the outputs from the vision programs, allows for a standalone vision system that relies upon machine vision tools to observe and evaluate the work of the worker/operator performing the operational steps. The visional programs are configured to place definable vision tools within the fields of view of cameras monitoring the work area, each vision tool configured to indicate when something is in a particular bounded region of 3D space.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A vision system for a work area comprises:
a first camera positioned with respect to a work area, wherein the first camera is positioned to have a field of view that includes a selected portion of the work area, and wherein the first camera is configured to capture video of the actions of a first worker performing a task at the work area;
a vision program comprising one or more vision tools, wherein a first vision tool of the one or more vision tools defines a first bounded region within the work area from the perspective of the first camera;
a controller comprising a memory and configured to control the first camera and to monitor the captured video of the first camera;
wherein the vision program is operable to monitor the captured video from the first camera for the first worker's interaction with the first vision tool, and wherein the vision program is operable to detect the first worker's interaction with the first vision tool;
wherein the vision program is operable to evaluate the detected interaction with the first vision tool to determine a user selection; and
wherein the controller is configured to output a signal to a separate computer system indicative of the first worker's interaction with the first vision tool, wherein the output signal comprises the user selection, and wherein the user input comprises an indication of a step completed, a defect report, an assistance request, or an input of production data.

2. The vision system of claim 1, wherein the output signal is transmitted via a communications protocol defining communications between the controller and the separate computer, wherein the controller is configured to translate or convert data signals sent to the separate computer from one protocol to a different protocol that is useable by the separate computer.

3. The vision system of claim 2, wherein the controller does not receive instructions or messages from the separate computer.

4. The vision system of claim 1 further comprising a plurality of cameras, wherein the plurality of cameras comprises the first camera, wherein the plurality of cameras is arranged around the work area such that their respective fields of view overlap each other to capture video of the actions of the first worker, and wherein the vision program comprises a second vision tool defining a second bounded region within the work area from the perspective of a second camera of the plurality of cameras, and wherein the first bounded region and the second bounded region are the same bounded region visualized from different camera perspectives.

5. The vision system of claim 4, wherein the vision program comprises a third vision tool defining a third bounded region within the work area from the perspective of the second camera, wherein the second bounded region and the third bounded region are different bounded regions within the work area.

6. The vision system of claim 5, wherein the controller is configured to accept user input to define the dimensions of any of the bounded regions of the first, second, and third vision tools, wherein the user-defined dimensional boundaries are stored in the memory.

7. The vision system of claim 4, wherein the vision program is configured to access captured video from any of the plurality of cameras.

8. A vision system for a work area comprises:
a first camera of a plurality of cameras positioned with respect to a work area, wherein the first camera is positioned to have a field of view that includes a selected portion of the work area, and wherein the first camera is configured to capture video of the actions of a first worker performing a task at the work area;
a second camera of the plurality of cameras positioned with respect to the work area, wherein the second camera is arranged such that its field of view overlaps the field of view of the first camera to capture video of the actions of the first worker;
a vision program comprising one or more vision tools, wherein a first vision tool of the one or more vision tools defines a first bounded region within the work area from the perspective of the first camera, wherein a second vision tool of the one or more vision tools defines a second bounded region within the work area from the perspective of the second camera, wherein the first bounded region and the second bounded region are the same bounded region visualized from different camera perspectives;
a controller comprising a memory and configured to control the first camera or the second camera and to monitor the captured video of the first camera or the second camera;
wherein the vision program is operable to monitor the captured video from the first camera, and wherein the vision program is configured to perform machine vision processing of the first bounded region visible in the captured video to detect any change in the first bounded region; and
wherein the controller is configured to output a signal to a separate computer system indicative of the change in the first bounded region.

9. The vision system of claim 8, wherein the first camera is one of a 3D camera, a 2D color camera, a 2D monochrome camera, and a thermal camera.

10. The vision system of claim 8, wherein the machine vision processing of the first bounded region in the captured video comprises at least one of: recognizing a selected part based on a match correlation function, looking for selected color hues, looking for human skin tones by recognizing selected color hues versus other unselected color hues, filtering out moving components, measure where a first point exists within a linear region, create statistics on contiguous blobs of pixels, read text or barcodes, detect high contrast areas, create depth information statistics comprising maximum, minimum, and deviation of depth in an area, detecting the presence and locations of retroreflective tape, and detecting whether a location is above or below a temperature threshold.

11. The vision system of claim 10, wherein the vision program is operable to perform one or more of the following when a change in the first bounded region in the captured video is detected: indicate via the output signal that a workpiece has arrived or left the work area, indicate via the output signal that a tool or clamp has been placed or removed, read information off of stickers/labels/paperwork about a workpiece and report via the output signal, and discriminate one type of workpiece from another type of workpiece and report via the output signal; verify and report via the output signal that a human is in the work area and in a proper place, that a torque tool is over a selected bolt, that parts are placed or removed as necessary from the workpiece, the measured length and location of components of a workpiece, that a selected soldering, brazing, or welding operation has occurred, and that food has been heated to a selected temperature for a selected period of time; and to confirm and report via the output signal that selected parts bins have been accessed for the purposes of error proofing a pick-to-light system, paper-based, or monitor-based picking operations.

12. The vision system of claim 8, wherein the controller is configured to accept user input to define the dimensions of any of the bounded regions of the first and second vision tools, wherein the user-defined dimensional boundaries are stored in the memory.

13. The vision system of claim 8, wherein the controller comprises a programmable logic controller.

14. The vision system of claim 8, wherein the output signal is transmitted via a communications protocol defining communications between the controller and the separate computer.

15. The vision system of claim 14, wherein the controller is configured to translate or convert data signals sent to the separate computer from one protocol to a different protocol that is useable by the separate computer.

16. A vision system for a work area comprises:

a plurality of cameras, wherein the plurality of cameras is arranged around a work area such that their respective fields of view overlap each other to capture video of the actions of a first worker;

a first camera of the plurality of cameras positioned with respect to the work area, wherein the first camera is positioned to have a field of view that includes a selected portion of the work area, and wherein the first camera is configured to capture video of the actions of the first worker performing a task at the work area;

a vision program comprising one or more vision tools, wherein a first vision tool of the one or more vision tools defines a first bounded region within the work area from the perspective of the first camera;

a controller comprising a memory and configured to control the first camera and to monitor the captured video of the first camera;

wherein the vision program is operable to monitor the captured video from the first camera for the first worker's interaction with the first vision tool, wherein the vision program is operable to detect the first worker's interaction with the first vision tool, and wherein the vision program comprises a second vision tool defining a second bounded region within the work area from the perspective of a second camera of the plurality of cameras, and wherein the first bounded region and the second bounded region are the same bounded region visualized from different camera perspectives; and wherein the controller is configured to output a signal to a separate computer system indicative of the first worker's interaction with the first vision tool.

17. The vision system of claim 16, wherein the output signal is transmitted via a communications protocol defining communications between the controller and the separate computer, wherein the controller is configured to translate or convert data signals sent to the separate computer from one protocol to a different protocol that is useable by the separate computer, and wherein the controller does not receive instructions or messages from the separate computer.

18. The vision system of claim 16, wherein the vision program comprises a third vision tool defining a third bounded region within the work area from the perspective of the second camera, wherein the second bounded region and the third bounded region are different bounded regions within the work area.

19. The vision system of claim 18, wherein the controller is configured to accept user input to define the dimensions of any of the bounded regions of the first, second, and third vision tools, wherein the user-defined dimensional boundaries are stored in the memory.

20. The vision system of claim 16, wherein the vision program is configured to access captured video from any of the plurality of cameras.

* * * * *